United States Patent
Kuo

(10) Patent No.: US 8,032,158 B2
(45) Date of Patent: Oct. 4, 2011

(54) METHOD OF TRANSMITTING PAGING INFORMATION FOR A WIRELESS COMMUNICATIONS SYSTEM AND RELATED APPARATUS

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 714 days.

(21) Appl. No.: 12/114,833

(22) Filed: May 5, 2008

(65) Prior Publication Data

US 2008/0274754 A1    Nov. 6, 2008

Related U.S. Application Data

(60) Provisional application No. 60/916,300, filed on May 6, 2007.

(51) Int. Cl.
*H04W 68/00* (2009.01)

(52) U.S. Cl. .......................... 455/458; 370/329

(58) Field of Classification Search .................. None
See application file for complete search history.

(56) References Cited

U.S. PATENT DOCUMENTS

| | | | |
|---|---|---|---|
| 2004/0176112 A1 | 9/2004 | Beckmann et al. | |
| 2005/0096017 A1* | 5/2005 | Kim | 455/414.1 |
| 2008/0089285 A1* | 4/2008 | Pirskanen et al. | 370/329 |
| 2009/0318170 A1* | 12/2009 | Lee et al. | 455/458 |

FOREIGN PATENT DOCUMENTS

| | | |
|---|---|---|
| EP | 1 283 648 A1 | 2/2003 |
| JP | 2006528456 A | 12/2006 |
| JP | 2010507323 A | 3/2010 |
| JP | 2010518747 A | 5/2010 |
| KR | 20020008399 | 1/2002 |
| WO | WO 0165869 A1 | 9/2001 |
| WO | 2004/028196 A1 | 4/2004 |

OTHER PUBLICATIONS

Nokia: "Introduction of HS-DSCH reception in CELL_FACH, URA_PCH and CELL_PCH" 3GPP TSG-WG2 Meeting #58, R2-072267, May 7-11, 2007.
3GPP, R2-071054 3GPP TSG-RAN WG2 Meeting #57, "Stage 2 updates for Enhanced CELL_FACH state in FDD", Feb. 2007
3GPP, R2-071693 3GPP TSG-RAN WG2 Meeting #58, "Introduction of HS-DSCH reception in CELL_FACH, URA_PCH and CELL_PCH", Jan. 2007.
3GPP TS 25.331 V7.4.0 (Mar. 2007) Radio Resource Control (RRC); Protocol Specification (Release 7), P.102~P.103.
3GPP TSG-WG2 Meeting #58, Kobe, Japan, 07.-Nov. 5, 2007 (R2-072305).
Office Action on corresponding JP Patent Application No. 2008-120436 from JPO issued on Nov. 30, 2010.

* cited by examiner

*Primary Examiner* — Erika Gary
(74) *Attorney, Agent, or Firm* — Klein, O'Neill & Singh, LLP

(57) ABSTRACT

A method of transmitting paging information for a network terminal of a wireless communications system including initiating a dedicated paging procedure to transmit dedicated paging information to a user equipment using a high speed downlink operation in a CELL_PCH state. The high speed downlink operation includes reception of a high speed downlink shared channel.

6 Claims, 4 Drawing Sheets

METHOD OF TRANSMITTING PAGING INFORMATION FOR A WIRELESS COMMUNICATIONS SYSTEM AND RELATED APPARATUS

CROSS REFERENCE TO RELATED APPLICATIONS

This application claims the benefit of U.S. Provisional Application No. 60/916,300, filed on May 06, 2007 and entitled "Method And Apparatus for Reception of Paging on HS-DSCH for the UE in CELL_PCH State in a Wireless Communication System", the contents of which are incorporated herein by reference.

BACKGROUND OF THE INVENTION

1. Field of the Invention

The present invention relates to a method of transmitting paging information for a wireless communications system and related communications device, and more particularly to a method of transmitting paging information to a user equipment in a CELL_PCH state in a wireless communications system and related communications device.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the 3rd Generation Partnership Project (3GPP) provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

On the basis of HSDPA, the 3GPP further introduces HS-DSCH (High Speed Downlink Shared Channel) reception in a CELL_PCH and a URA_PCH state, allowing the UE in the CELL_PCH or the URA_PCH state to monitor an HS-DSCH accompanied with a Shared Control Channel for HS-DSCH (HS-SCCH) for downlink data reception, so as to improve a peak data rate, a signaling delay, a state transition delay, download times and flexible cell capacity. In the HS-DSCH reception in the CELL_PCH and URA_PCH state, the HS-DSCH is a transport channel allowed to map on dedicated-type logic channels including a Dedicated Control Channel (DCCH) and a Dedicated Traffic Channel (DTCH) or common-type logic channels including a Paging Control Channel (PCCH) and a Broadcast Control Channel (BCCH).

A UMTS radio access network (UTRAN) enables the HS-DSCH reception in the CELL_PCH and the URA_PCH state by including parameters, related to radio resource control (RRC) configuration of PICH (Paging Indicator Channel), HS-SCCH, HS-DSCH and an H-RNTI (HS-DSCH radio network transaction identifier) for PCCH transmission, in the system information broadcast. The parameters are configured in a "HS-DSCH paging system information" information element (IE) included in a system information block (SIB) type 5/5bis sent from the UTRAN to the UE.

During performance of the HS-DSCH reception in the CELL_PCH and the URA_PCH state, the UE may use a common or a dedicated H-RNTI as a UE identity for reception of HS-DSCH packets.

The common H-RNTI can be shared by multiple UEs, whereas each dedicated H-RNTI is only allocated to one UE. During reception of downlink media access control (MAC) packets, the UE using the common H-RNTI needs to determine whether the received packets are of its own with UE identification information (i.e. UE ID and UE ID Type) in the packet header. On the other hand, the MAC packets for the UE using the dedicated H-RNTI include no UE identification information to provide better data transmission efficiency. As a result, PCCH reception requires the common H-RNTI, and DCCH and DTCH receptions require the dedicated H-RNTI. Furthermore, with the available HS-DSCH reception, the UE using the dedicated H-RNTI in the CELL_PCH state can perform downlink and uplink data transmissions without a cell update procedure.

When the UTRAN allocates a dedicated H-RNTI to the UE, the UE stores the dedicated H-RNTI in an H_RNTI variable. In addition, when the UE is in the CELL_PCH state and the SIB type 5/5bis includes the "HS-DSCH paging system information" IE, the UE has to use the dedicated H_RNTI for the HS-DSCH reception if the H_RNTI variable is set, otherwise the UE selects the common H-RNTI from the "HS-DSCH paging system information" IE.

Two methods for paging information transmission are provided in the related RRC specification. The first method is applied to the UE in an idle mode, a CELL_PCH state, or a URA_PCH sate. In the first method, the UTRAN transmit a PAGING TYPE 1 message to the UE via the PCCH, and correspondingly the UE has to receive the PAGING TYPE 1 message with a common H-RNTI.

The second method is a dedicated paging procedure that is only applied to the UE in a CELL_FACH and a CELL_DCH state. The UTRAN transmits a PAGING TYPE 2 message for initiation of the dedicated paging procedure.

As can be derived from the above description, the UE using the dedicated H-RNTI in the CELL_PCH state is not applied to any of the first and second methods. Thus, the UE using the dedicated H-RNTI in the CELL_PCH state is unable to receive both PAGING TYPE 1 and PAGING TYPE 2 messages and thereby can result in a miss of the paging information associated with a terminating call.

SUMMARY OF THE INVENTION

The present invention therefore provides a method of transmitting paging information for a network terminal of a wireless communications system and related communications device that can prevent the UE from missing paging information corresponding to a terminating call.

The present invention discloses a method of transmitting paging information for a network terminal of a wireless communications system. The method includes initiating a dedicated paging procedure to transmit dedicated paging information to a user equipment using a high speed downlink operation in a CELL_PCH state The present invention further discloses a communications device in of a wireless communications system for transmitting paging information to a user equipment in a CELL_PCH state to avoid a miss of paging information associated with a terminating call. The communications device uses a dedicated H-RNTI for a high speed downlink operation in a CELL_PCH state and includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes initiating a dedicated paging procedure to transmit dedicated paging information to the user equipment using a high speed downlink operation in the CELL_PCH state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
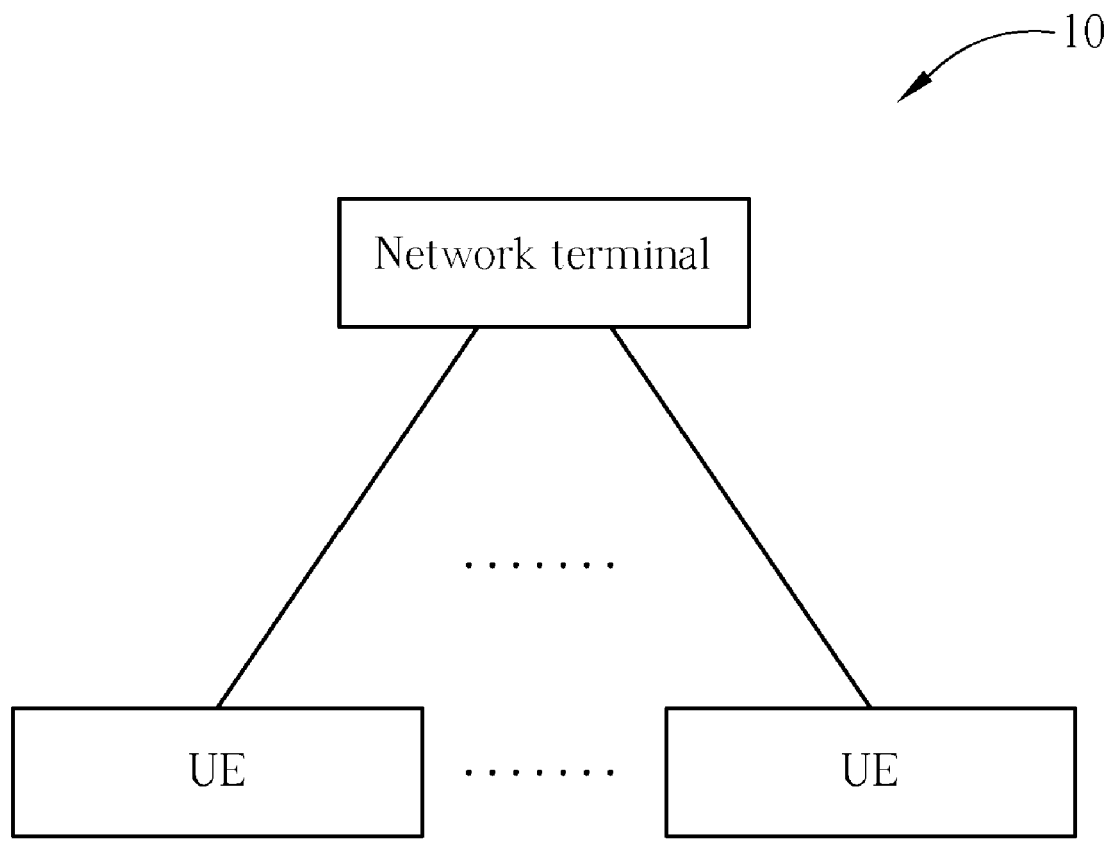
FIG. 1 is a schematic diagram of a wireless communications system.
Figure 4:
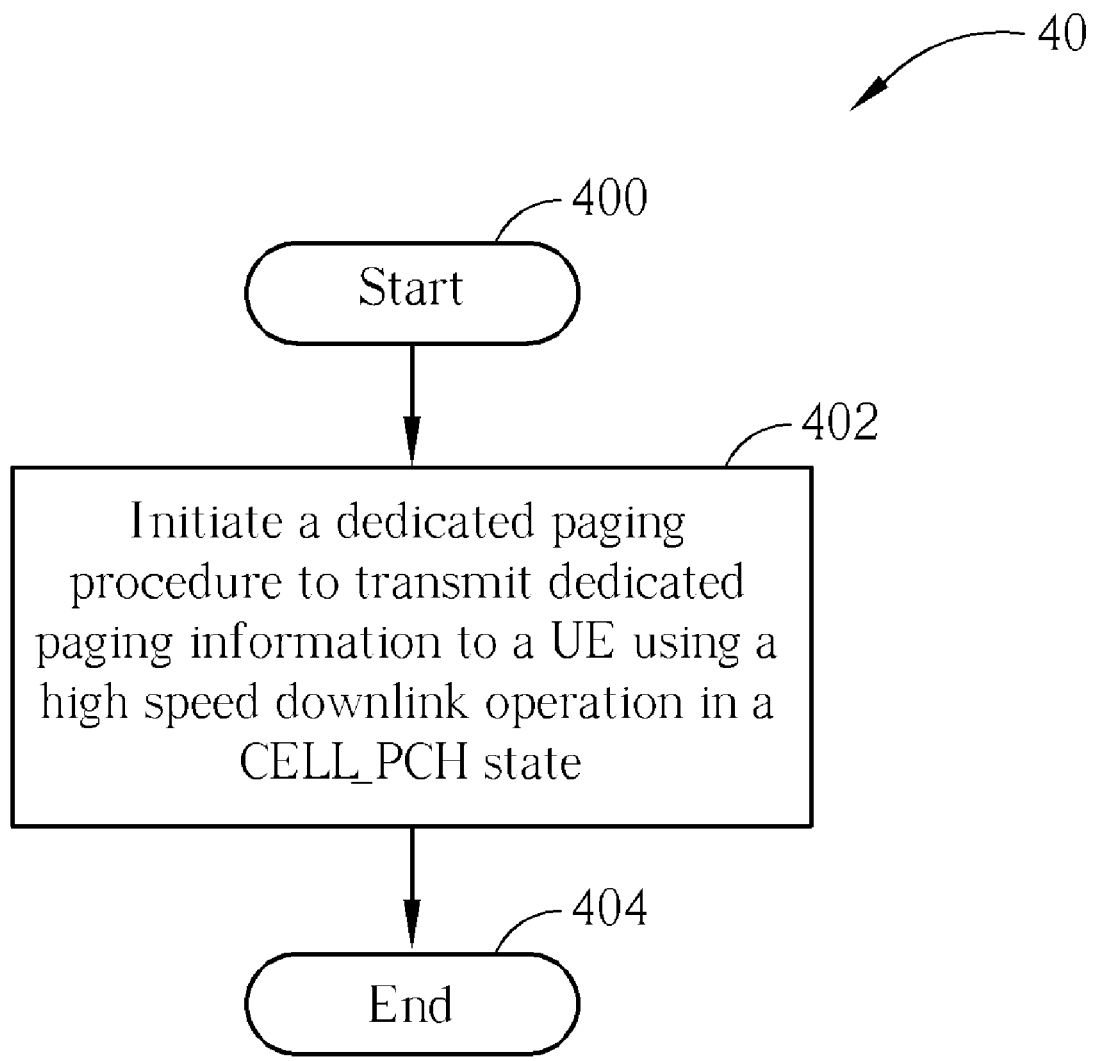
FIG. 4 is a flowchart diagram of a process according to an embodiment of the present invention.

Please refer to FIG. 1, which is a schematic diagram of a wireless communications system 10. The wireless communications system 10 is preferred to be a high-speed packet access (HSPA) system of a third generation (3G) mobile communications system, and is briefly formed with a network terminal and a plurality of user equipments. In FIG. 4, the network terminal and the user equipments are simply utilized for illustrating the structure of the wireless communications system 10. Practically, the network terminal may include a plurality of base stations, radio network controllers and so on according to actual demands, and the user equipments (UEs) can be apparatuses such as mobile phones, computer systems, etc.

Figure 2:
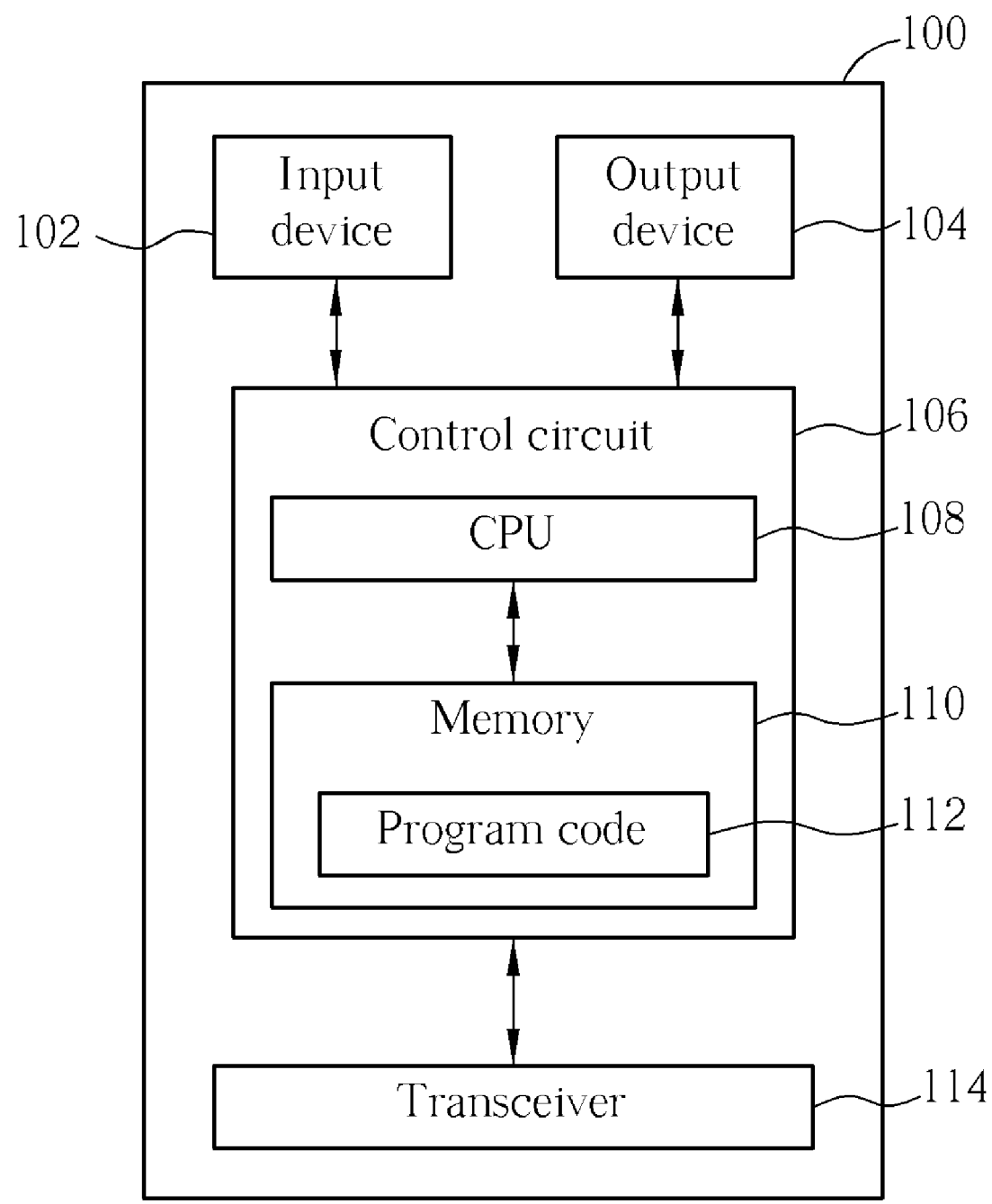
FIG. 2 is a functional block diagram of a communications device.

Please refer to FIG. 2, which is a functional block diagram of a communications device 100. The communications device 100 can be utilized for realizing the network terminal in FIG. 1. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a HSPA system of a third generation (3G) mobile communications system and supports a high speed downlink operation corresponding to a CELL_PCH state, including HS-DSCH reception in the CELL_PCH state.

Figure 3:
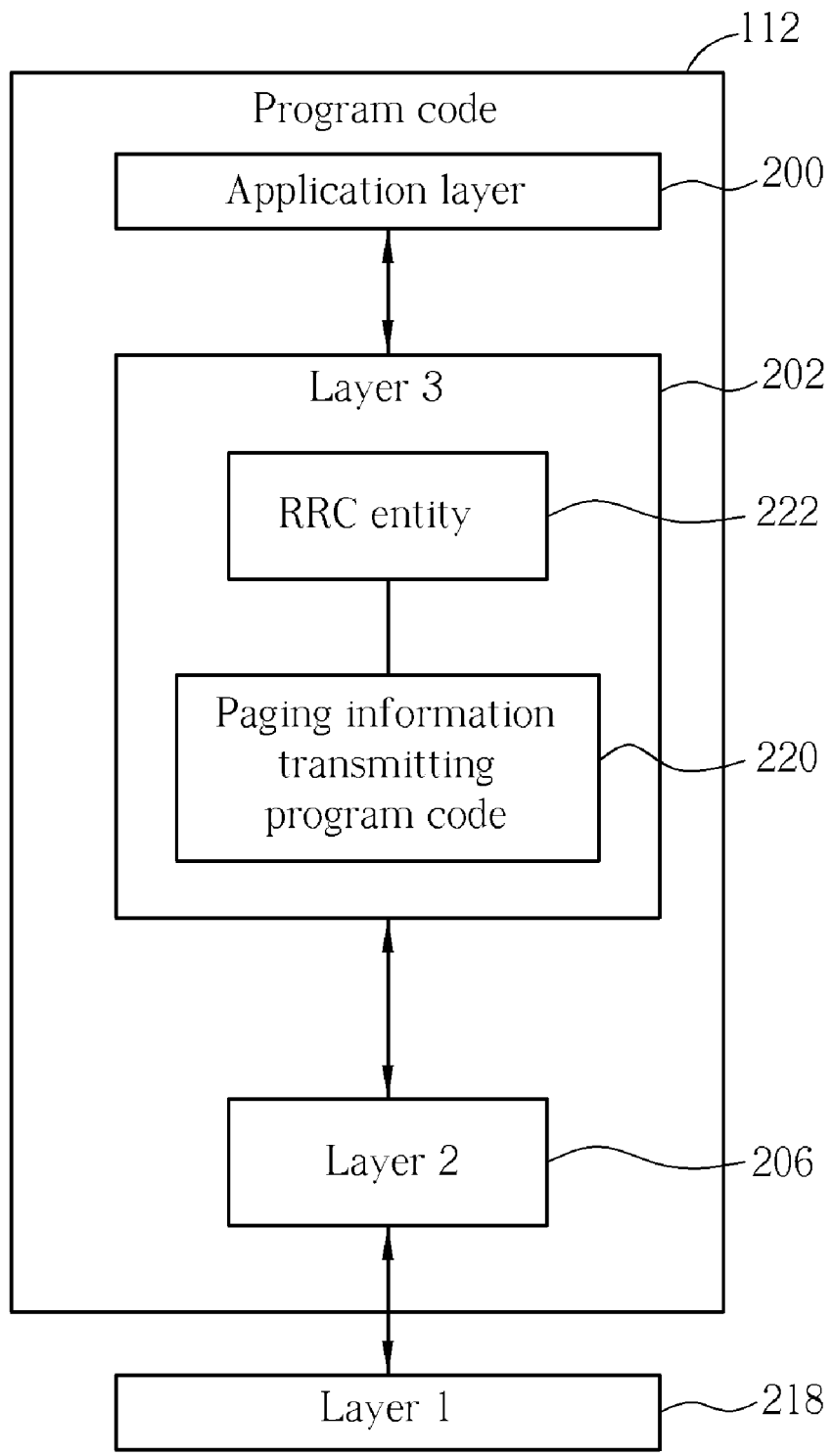
FIG. 3 is a diagram of the program code shown in FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206 with RRC messages and information elements (IEs) and performing peer-to-peer communication with the UEs of the wireless communications system 10. The Layer 2 206 includes a radio link control (RLC) layer and a media access control (MAC) layer, which exchange packets via logic channels. In addition, the MAC layer exchanges MAC packets with the Layer 1 218 via transport channels, whereas the Layer 1 218 exchanges radio signals with the UE of the wireless communications system 10.

Under the HS-DSCH reception in the CELL_PCH state, the associated logic channels include the DTCH, DCCH, PCCH and BCCH. The associated transport channels include the HS-DSCH used for dedicated packet transmission accompanied with signaling transmission of an HS-SCCH (physical channel).

The communications device 100 can allocate a common or dedicated H-RNTI to the UE for the high speed downlink operation. When the UE performs the high speed downlink operation in the CELL_PCH state with the dedicated H-RNTI, the UE receives packets transmitted on the HS-DSCH mapped to the DTCH and DCCH. In this situation, the embodiment of the present invention provides a paging information transmitting program code 220 in the program code 112 to prevent the UE from missing a terminating call due to inability to receive the associated paging information. Please refer to FIG. 4, which illustrates a schematic diagram of a process 40 according to an embodiment of the present invention. The process 40 is utilized to transmit paging information for a network terminal of the wireless communications system 10, and can be compiled into the paging information transmitting program code 220. The process 40 includes the following steps:

Step 400: Start.

Step 402: Initiate a dedicated paging procedure to transmit dedicated paging information to a UE using a high speed downlink operation in a CELL_PCH state.

Step 404: End.

According to the process 40, the network terminal transmits the dedicated paging information to a UE using a high speed downlink operation in a CELL_PCH state by initiate the dedicated paging procedure, so as to achieve notification of a terminating call. Preferably, the network terminal initiates a dedicated paging procedure by transmitting a PAGING TYPE 2 message to the UE via the DCCH. The UE performs the high speed downlink operation according to the dedicated H-RNTI and receives the PAGING TYPE 2 message via the DCCH mapped to the HS-DSCH.

In the prior art, the UE does not receive the dedicated paging information when the UE performs the HS-DSCH reception in the CELL_PCH state with the dedicated H-RNTI. In the embodiment of the present invention, the dedicated paging procedure is applied to the UE in the CELL_PCH state and thereby allows the UE to receive the dedicated paging information corresponding to a terminating call. Therefore, the embodiment of the present invention can prevent the UE from missing a terminating call.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting paging information for a network terminal of a wireless communications system, the method comprising:
    initiating a dedicated paging procedure to transmit a PAGING TYPE 2 message via a dedicated control channel mapped to a high speed downlink shared channel, known as HS-DSCH, to a user equipment using a high speed downlink operation in a CELL_PCH state.

2. The method of claim 1, wherein the user equipment performs the high speed downlink operation according to a dedicated HS-DSCH radio network transaction identifier, known as H-RNTI.

3. The method of claim 1, wherein the high speed downlink operation comprises reception of a high speed downlink shared channel.

4. A communications device of a wireless communications system for transmitting paging information to a user equipment in a CELL_PCH state, the communications device comprising:
    a control circuit for realizing functions of the communications device;
    a central processing unit coupled to the control circuit for executing a program code to operate the control circuit; and
    a memory coupled to the central processing unit for storing the program code;
    wherein the program code comprises:
        initiating a dedicated paging procedure to transmit a PAGING TYPE 2 message via a dedicated control channel mapped to a high speed downlink shared channel, known as HS-DSCH, to a user equipment using a high speed downlink operation in a CELL_PCH state.

5. The communications device of claim 4, wherein the user equipment performs the high speed downlink operation according to a dedicated HS-DSCH radio network transaction identifier, known as H-RNTI.

6. The communications device of claim 4, wherein the high speed downlink operation comprises reception of a high speed downlink shared channel.

* * * * *